Jan. 6, 1970    R. L. WOOLFOLK    3,487,568
DISPLAY APPARATUS
Filed June 9, 1967    6 Sheets-Sheet 1

INVENTOR
Robert L. Woolfolk

BY

ATTORNEYS

Jan. 6, 1970  R. L. WOOLFOLK  3,487,568
DISPLAY APPARATUS
Filed June 9, 1967  6 Sheets-Sheet 2

INVENTOR
Robert L. Woolfolk
BY
ATTORNEYS

INVENTOR
Robert L. Woolfolk
ATTORNEYS

Jan. 6, 1970   R. L. WOOLFOLK   3,487,568
DISPLAY APPARATUS
Filed June 9, 1967   6 Sheets-Sheet 5

INVENTOR
Robert L. Woolfolk
BY *Hastings Ackley and Walter J. Jay*
ATTORNEYS

Fig. 15

INVENTOR
Robert L. Woolfolk
BY
ATTORNEYS

United States Patent Office 3,487,568
Patented Jan. 6, 1970

3,487,568
DISPLAY APPARATUS
Robert L. Woolfolk, 10454 Lippitt,
Dallas, Tex. 75218
Filed June 9, 1967, Ser. No. 645,022
Int. Cl. G09f 11/00
U.S. Cl. 40—28                     34 Claims

ABSTRACT OF THE DISCLOSURE

Display apparatus for presenting data in visual form having panels provided with passages in which display elements, such as balls, are movably positioned and means for selectively moving the balls in their passages between their operative visible positions and their inoperative positions to cause the balls to form or delineate characters. The display apparatus may include a plurality of such panels connected in an endless belt and movable before an opening or window so that the data on more than one panel may be visible at a single time. The means for moving the balls may be jets of air delivered by nozzles mounted on a carriage movable relative to a panel when it is in a predetermined position.

This invention relates to display apparatus and more particularly to a display for visually presenting data or information.

An object of this invention is to provide a new and improved display apparatus for visually displaying data which has a plurality of discrete elements mounted on panels for movement between inoperative positions wherein they are not visible to the view and operative positions wherein they are visible.

Another object is to provide a display apparatus having a panel provided with a plurality of passages in which are disposed display elements, such as balls, which are movable between front or outer operative positions at the front side of the panel wherein they are visible and rear or inner inoperative positions wherein they are not visible.

Still another object is to provide a display device wherein the balls of the panel are held in their operative and inoperative positions by gravity.

A further object is to provide a display apparatus wherein the balls of a panel are movable between their operative and inoperative positions by an operator means or assembly which is movable relative to the panel and has means for directing jets of air at selected balls to move them between their operative and inoperative positions as the operator means moves past the panel.

A still further object is to provide a display apparatus which includes a plurality of panels connected in an endless belt and forming a display assembly movable in a closed path which includes a front vertical view portion so that the data displayed by a plurality of panels in the front vertical portion is visible to a viewer.

Another object is to provide a display apparatus which permits the display of a large amount of data at any one time.

A still further object of the invention is to provide a display apparatus including a panel having a plurality of spaced groups of passages, each of the groups comprising a plurality of passages arranged in vertical columns and horizontal rows, balls movably mounted in the passages of each group which in operative positions are adapted to form or delineate different characters, such as letters or numerals, and a carriage movable relative to the panel and having nozzles aligned with the horizontal rows of passages for selectively delivering jets of air to the ends of the passages of each column as the nozzles move therepast.

A further object is to provide a display apparatus wherein the carriage and the panels have index means for permitting operation of the nozzles only when the nozzles move into alignment with the passages of each column of passages.

A still further object is to provide a display apparatus wherein the panel assembly is movable in a closed path and wherein each of the panels is provided with index means and the carriage is provided with sensor means for arresting movement of each panel when it moves in proper alignment with the nozzles of the carriage.

Another important object of the invention is to provide a display apparatus for translating data received in digital form, as for example, over Teletype lines, into visible alphanumeric characters.

Still another object is to provide control means for controlling operation of the carriage and its nozzles and of the display assembly or belt of panels in accordance with the signals received over a Teletype line.

Additional objects and advantages of the invention will be readily apparent from the reading of the following description of a device constructed in accordance with the invention, and reference to the accompanying drawings thereof, wherein:

Figure 1:
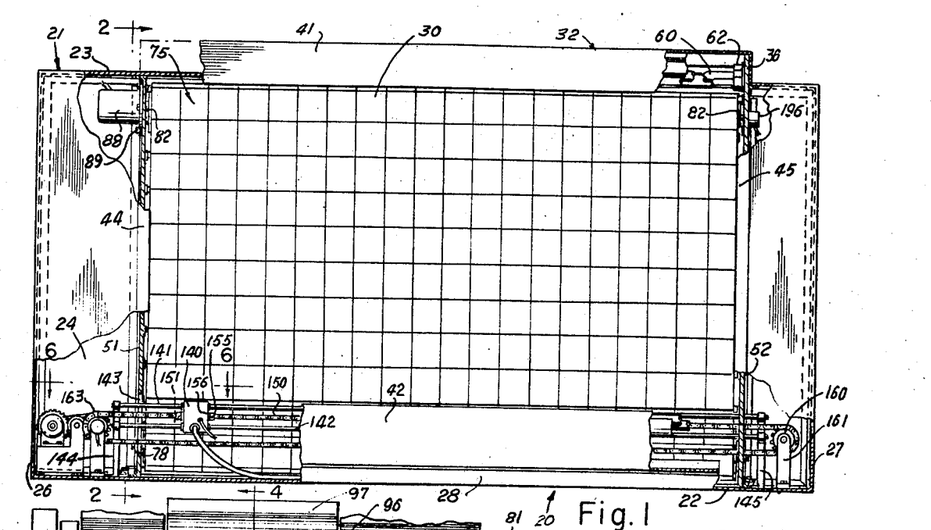
FIGURE 1 is a front partly schematic view, with some parts broken away, of a display apparatus embodying the invention.

Referring now particularly to the drawings, the display apparatus 20 includes a housing 21 having a horizontal bottom wall 22, a top wall 23, a rear wall 24, side walls 26 and 27, and a front wall 28. The front wall has a display aperture or window 30 therein.

Figures 2, 3:
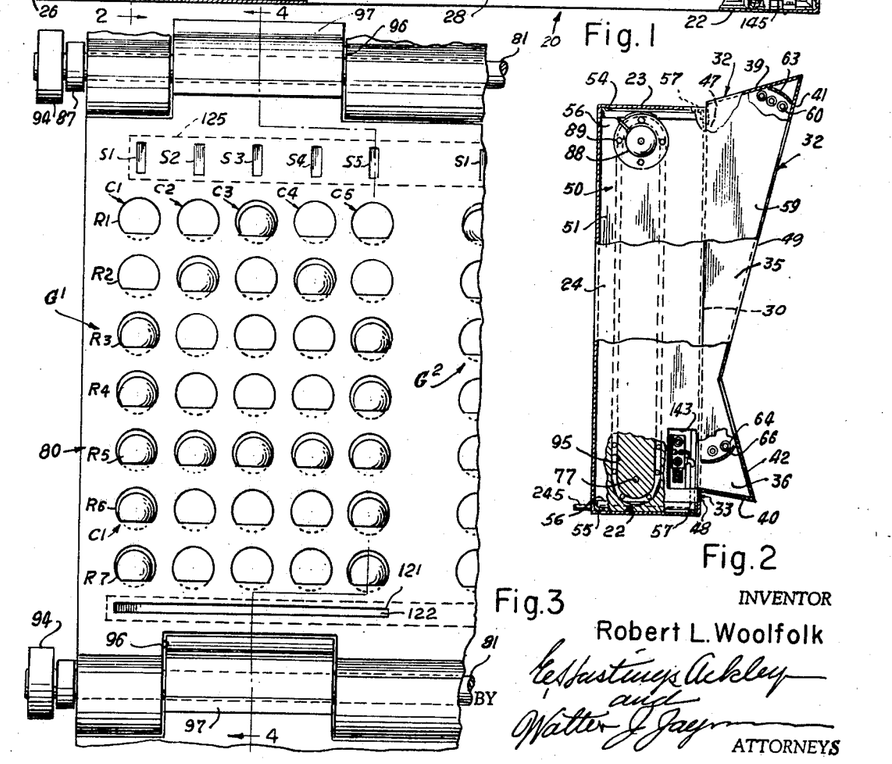
FIGURE 2 is a vertical partly schematic partly sectional view taken on line 2—2 of FIGURE 1.
FIGURE 3 is a front enlarged fragmentary view of a panel of the display apparatus illustrated in FIGURES 1 and 2.

As best shown in FIGURE 2, a light case 32 is rigidly secured to the front wall and about the window 30 and includes side sections 35 and 36, top and bottom sections 39 and 40 which extend divergently forwardly relative to one another, top and bottom front sections 41 and 42 which extend convergently rearwardly from the front edges of the top and bottom sections, and side front sections 44 and 45 which extend inwardly from the side sections 35 and 36, respectively. The top and bottom sections may have flanges 47 and 48, respectively, which abut and are rigidly secured to the front housing wall by screws 33. The front sections 41, 42, 44 and 45 define an aperture or window 49 which opens to the window 30 of the housing.

Figure 6:
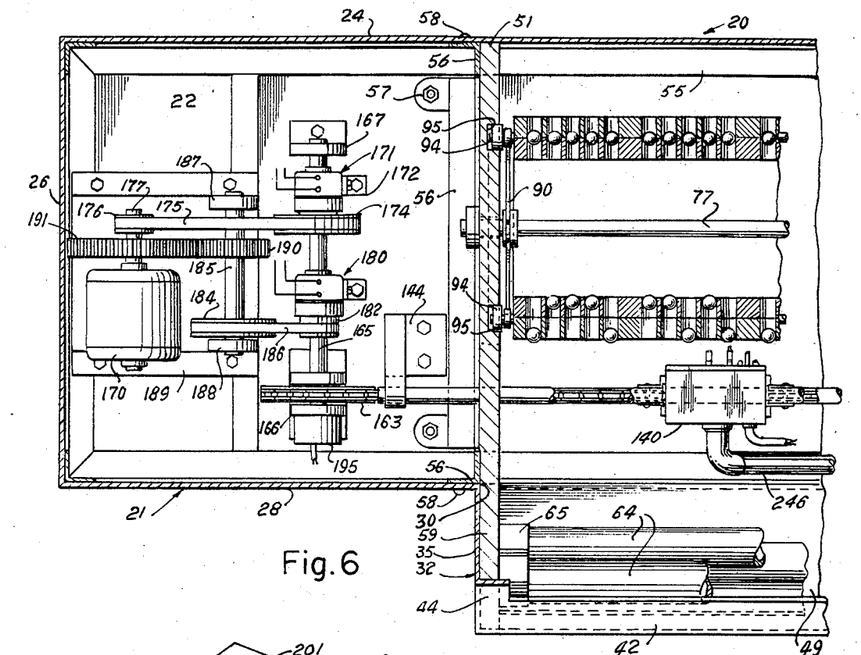
FIGURE 6 is an enlarged partly schematic sectional view taken on line 6—6 of FIGURE 1.

A support frame 50 is mounted in the housing 21 and includes a pair of vertical support plates 51 and 52, and top and bottom angle members 54 and 55 which extend between the two support plates and are rigidly secured thereto as by welding. The support plates may also have angle members 56 at their outer peripheral edge portions similarly secured thereto. The peripheral angle members have flanges which abut adjacent walls of the housing and are secured thereto in any suitable manner, as by bolts 57 in the case of the peripheral angle members at the upper and lower ends of the support plates and as by screws 58 (FIGURE 6) in the case of the peripheral angle members which abut the front and rear walls. The support plates have forward portions which extend forwardly through the window 30 of the housing and into the light case.

A plurality of light tubes 60 which emit light of a predetermined wavelength, which is not within the spectrum perceivable by the human eye, are mounted on the support plates in the upper portion of the light case by means of the usual sockets 62 located above the lower edge of the top flange 41 of the light case and below a reflector plate 63 of the light case so that light emitted by the tubes is directed downwardly and rearwardly through the housing window.

A pair of similar light tubes 64 are mounted on the support plate below the top edge of the bottom front flange of the light case by means of the usual sockets 65 above a reflector plate 66 of the light case so that the light emitted thereby is directed upwardly and rearwardly through the housing window.

A movable display assembly 75 is mounted on and between the support plates 51 and 52 by means of a top drive shaft 76 (FIGURE 5) and a bottom idler shaft 77 rotatably mounted on the plates by means of suitable bearings 78. The display assembly includes a plurality of panels 80 connected by horizontal pivot shafts 81 in a manner to be described in greater detail below. A pair of sprockets 82 rigidly secured to the drive shaft have spaced radial arms 84 in whose outer recesses 85 are receivable the rollers 87 mounted on the pivot shaft 81. It will be apparent that as the drive shaft is rotated in a counterclockwise manner, FIGURE 5, the engagement of the sprocket arms with the rollers 87 causes the front portion of the display assembly visible through the housing window to be moved upwardly. The drive shaft 76 is driven by a suitable electric motor 88 which is rigidly secured to the support plate 51 by means of bolts 89. The motor is preferably of the synchronous type having a permanent magnet armature in order that the rotation of the drive shaft be arrested immediately when the stator windings of the motor are disconnected from a source of alternating current. The idler shaft 77 is provided with similar sprockets 90 rigidly secured thereto whose radial arms 91 are provided with recesses or sockets 92 in which the rollers 87 of the pivot shafts are receivable. The sprockets of the drive and idler shafts are aligned vertically and inwardly of the support plates.

The panels 80 are connected by the pivot shafts to form an endless belt which travels in a closed path having a front portion A in which the panels move upwardly adjacent to and past the housing window 30, an upper portion B in which the panels move rearwardly, a rear portion C in which the panels move downwardly and a bottom portion D in which the panels move forwardly. The panels are guided in their movement in this closed path not only by the sprockets of the drive and idler shafts but also by the guide rollers 94 (FIGURE 6) rotatably mounted on the opposite ends of the pivot shafts and movably disposed in the guide recesses 95 of the support plates. The guide recesses are of somewhat greater width than the diameter of the guide rollers.

Adjacent top and bottom edges of adjacent panels are provided with slots 96 (FIGURE 3) and tongues 97, the tongues of one panel being received in the slots of the other. The pivot shafts extend through such slots and through bearings 98 (FIGURE 4) carried by the tongues.

It will be apparent that the display assembly is guided and held in a desired path of movement by the engagement of the sprockets of the drive and idler shafts with the rollers 87 of the pivot shafts and also by the engagement of the guide rollers 94 with the surfaces of the support plates defining the guide recesses.

When the panels are located in the front portion A of the path of movement of the display assembly 75, the outer sides of all such panels, except the lowermost panel located in the path portion A, are visible to view through the windows 49 and 30 of the light case and the housing, respectively.

Figure 4:
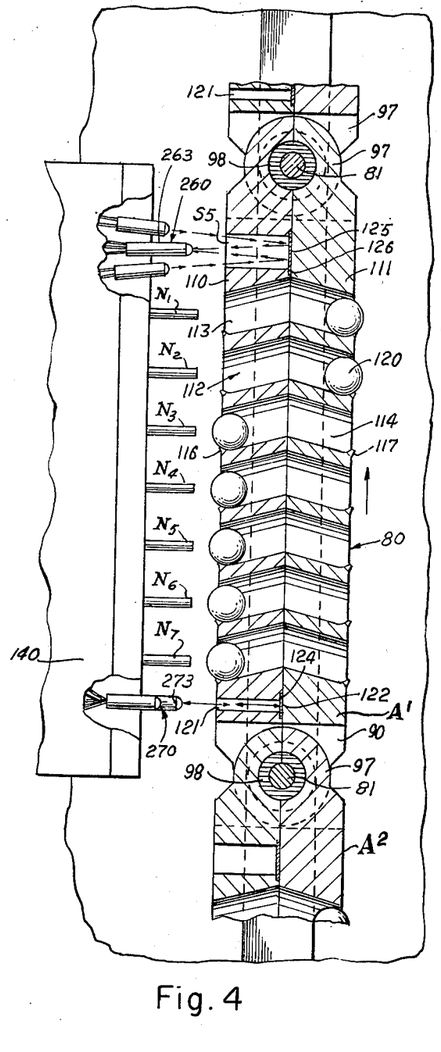
FIGURE 4 is a schematic, fragmentary partly sectional view, with some parts broken away, taken on line 4—4 of FIGURE 3.

As best shown in FIGURE 4, each of the panels may be formed of a planar outer member 110 and a planar inner member 111 secured to one another in any suitable manner, as by adhesive, bonding and the like. The panels have transverse passages 112 therethrough which are formed by the divergently outwardly sloping bores 113 and 114 of the outer and inner panel members, respectively, so that the opposite portions of the passages of a panel slope downwardly and outwardly from the middle of the panel when the panel is in the front view portion A of the path of movement, and slope upwardly and outwardly when the panel is in the rear portion C of the path of movement. Each outer end of the passage is reduced as by the lips 116 and 117 to prevent movable elements 120 located in the passages from moving out of the passages.

The bores 113 constitute outer portions of the passages since they open outwardly at the outer face or surface of the path of movement of the panels and the bores 114 constitute inner portions of the passages since they open inwardly relative to the path of movement of the panels.

Figure 5:
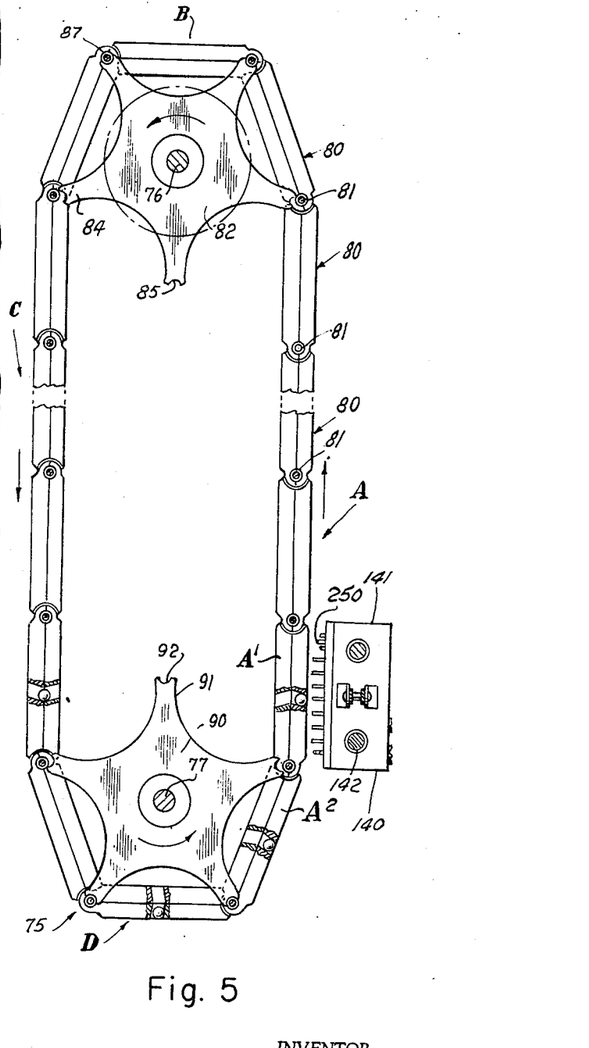
FIGURE 5 is a schematic view of the display assembly or belt of panels of the apparatus.

As is illustrated in FIGURE 5, when a movable element is in either its outer operative position or inner operative position on the panel, i.e., in the outer or inner portion of a passage at the time the panel is in the vertical portion A of the path of movement, it is held in such position by gravity and its outward movement in the passage is limited by a lip 116 or 117.

As a panel moves rearwardly and upwardly and then rearwardly and downwardly in the portion B of the path of movement, the elements move due to the force of gravity first to their inner position wherein their movement is limited by the lips 116 and then to the middle of the passages and remain in the middle during the downward movement of the panel in the rear portion C of the path of movement. As the panel then moves downwardly and forwardly and then forwardly and upwardly, all of the elements move to their outer positions in the passages of the panel wherein their outward movement is limited by the lips 116 so that as each panel is moved to a vertical position at the bottom end of the front view portion A of its movement, all of the elements carried thereby are in their outer operative positions. If, thereafter, any such element is moved, as will be described below, inwardly in its panel passage to its inner inoperative position, it will be held in such inoperative position by gravity as long as the panel is in the front view portion of the path of movement.

If, as illustrated in FIGURES 1 and 3, the panels are designed to display alpha-numeric characters, the passages are arranged in longitudinally spaced character groups $G_1, G_2 \ldots G_n$, the passages of each group being arranged in a plurality, for example, 5 vertical columns C1–C5 and a plurality, for example, 7, rows R1–R7.

Each panel has a bottom longitudinal slot 121 through which a portion of a reflective strip 122, secured between the two panel members 110 and 111, is exposed. The reflective strip may be disposed in a longitudinal recess 124 of the panel member 110. A similar strip 125 of reflective substance located above the passages of each panel is disposed in an internal longitudinal recess of the outer panel member 110. Portions of the strip 125 in alignment with the columns of the passages are exposed through the slots S1, S2, S3, S4 and S5 of the outer panel member 110. The reflective strip 122 is used as an index means to control the vertical positioning of each panel relative to a movable carriage 140 as the panels move successively into alignment with the carriage so that the outer ends of the passages in the rows R1–R7 will be in proper alignment with the nozzles N1–N7, respectively, of the carriage. The portions of the reflective strip 125 exposed through the slots S1–S5 are used to control the operation of valve means associated with the nozzles, which control flow of gas under pressure to the nozzles, as the nozzles move successively into alignment with the outer ends of the passages of each column C1–C5 in a manner to be described below.

Figure 7:
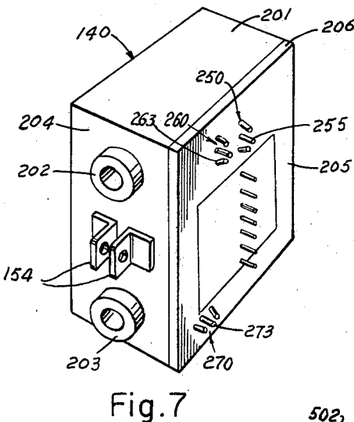
FIGURE 7 is a partly schematic perspective view of the operator means or carriage of the apparatus illustrated in FIGURE 1.

The carriage is movable horizontally, in front of the lowermost panel in the portion A of the path of movement of the panels, on a pair of slide bars 141 and 142. The slide bars extend through openings 143 (FIGURES 1 and 2) in the support plates 51 and 52 and their opposite ends are rigidly secured to suitable brackets 144 and 145 disposed outwardly of the support plates 51 and 52, respectively. The brackets are secured to the bottom housing wall 22. The carriage is movable on the slide bars by a sprocket chain 150 one of whose ends is secured to one side of the carriage by a bolt 151 which extends through suitable apertures in one end link of the sprocket chain and the brackets 154 (FIGURE 7) secured to one side of the carriage. The other end of the chain 150 is similarly secured to the opposite side of the carriage by a bolt 155 and brackets 156.

The sprocket chain extends about an idler sprocket 160 rotatably mounted on a bracket 161 secured to the housing bottom wall 22 outwardly of the support plate 52 and about a drive sprocket 163 rigidly secured to a drive shaft 165 (FIGURE 6) rotatably mounted in suitable bearings of a pair of support brackets 166 and 167. The drive sprocket shaft 165, and therefore, the drive sprocket 163, are driven in a clockwise direction, FIGURE 1, by a motor 170 when the electric clutch 171 is energized. The clutch may be of any suitable type for example, the type available from American Precision Industries, Inc., of Buffalo, N.Y., under Model No. API LLCF–20 and is mounted on the bottom housing wall by a bracket 172. The clutch 171 when energized causes a pulley 174 to be connected rigidly to the drive shaft. A belt 175 connects the pulley 174 to a pulley 176 rigidly secured to the drive shaft 177 of the motor.

The drive sprocket shaft is rotated by the motor in a counterclockwise direction, FIGURE 1, when an electric clutch 180 which may be identical to the clutch 171, is energized. Energization of the clutch 180 connects a pulley 182 to the drive sprocket shaft. The pulley 182 is connected to a pulley 184 rigidly secured on a reversing shaft 185 by a belt 186. The reversing shaft is rotatably mounted on pillow blocks 187 and 188 rigidly secured to the mount plate 189 of the motor. A gear 190 rigidly secured to the reversing shaft meshes with a gear 191 rigidly secured to the motor drive shaft 177.

It will be apparent that since the pulley 174 is bigger than the pulley 176 while the pulley 182 is smaller than the pulley 184 and the gear 190 is smaller than the gear 191, the shaft 165, and therefore the drive sprocket 163, will be rotated at a slower speed in a clockwise direction than in a counterclockwise direction.

It will thus be apparent that the carriage will move from right to left, FIGURE 1, at a much greater speed than it is moved from left to right. Due to the provision of the two electrically operated clutches 171 and 180, the motor is energized continuously during the operation of the apparatus and, depending on which clutch is energized, will move the carriage relatively slowly from left to right and very rapidly from right to left.

An electrically operated brake 195 (FIGURE 6) mounted on the support bracket 166 is provided to brake or arrest the rotation of the shaft 165 when the carriage approaches the extreme limits of its movement to prevent forceably engaging either of the brackets 144 and 145. Similary, an electric brake 196 (FIGURE 1) mounted on the support plate 52 is provided to arrest rotation of the shaft 76, and, therefore, of the upward movement of the front view portion of the display assembly, when a bottom panel thereof moves into proper alignment with the nozzles of the carriage. The brake may be of the type commercially available from American Precision Industries, Inc. under Model No. LLBF–20.

The panels are coated with a black light absorbing non-reflective substance, or are formed of such light absorbing substance, so that the light emitted by the light tubes 60 and 64 and impinging on the outer surface of the panels is absorbed. The balls or display elements, however, are of a substance which is caused to fluoresce when the light of predetermined wave length, for example, the so-called black light, emitted by the light tubes impinges thereon. The spherical shape of the display elements, which may be relatively small, for example, three-sixteenths of an inch in diameter, and the light contrast between the balls in their outer visible positions and the panels causes the characters formed or delineated by such balls to be clearly visible and the characters so formed to be sharply defined.

Figure 8:
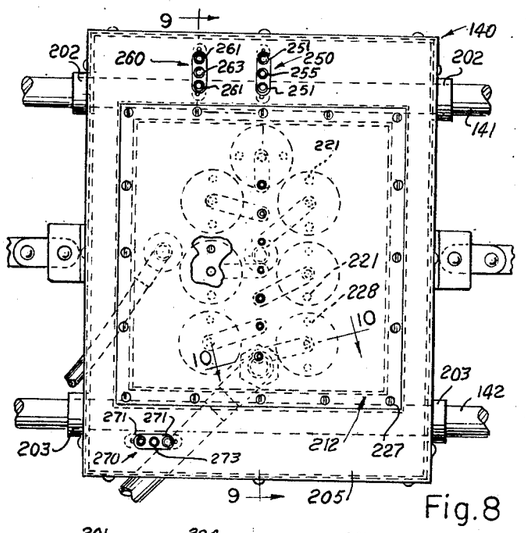
FIGURE 8 is an enlarged front view of the carriage of the display apparatus.
Figure 9:
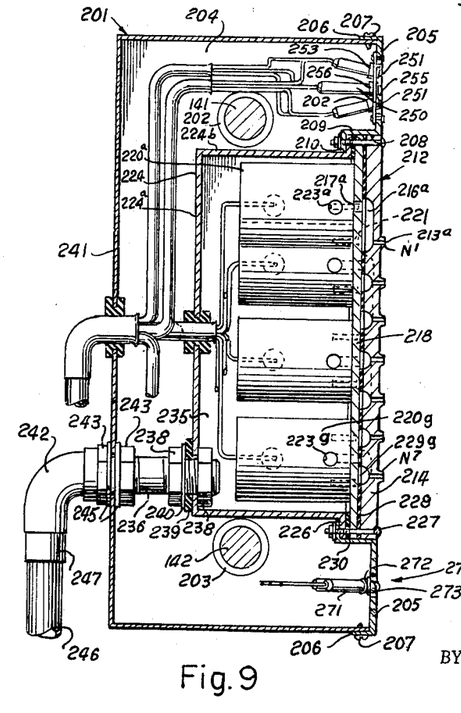
FIGURE 9 is a vertical sectional view taken on line 9—9 of FIGURE 8.
Figure 10:
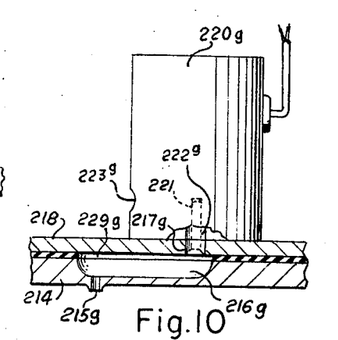
FIGURE 10 is an enlarged fragmentary partly sectional view taken on line 10—10 of FIGURE 8.
Figure 11:
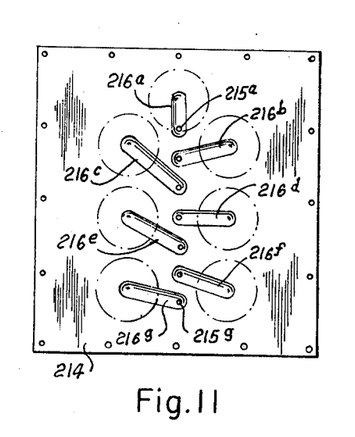
FIGURE 11 is a plan view of an orifice plate of the carriage.

The carriage 140 may include a substantially rectangular housing 201 (FIGURES 7–9) having suitable bearings 202 and 203 secured to its opposite end walls 204 through which extend the slide bars 141 and 142, respectively. The front wall 205 of the housing may have a flange 206 which telescopes over the end, top and bottom walls of the housing and is secured thereto by screws 207. The front wall has a rectangular opening 208 defined by an inwardly extending continuous flange 209 having a continuous stop flange 210 at its inner edge which limits inward movement of a manifold assembly 212 into the housing through the opening. The manifold assembly includes an orifice plate 214 having the seven vertically spaced apertures 215a–g of the nozzles, N1–N7, respectively. The nozzles may be integral with the orifice plate and extend forwardly therefrom. The apertures 215a–g open to grooves 216a–g, respectively, in the inner surface of the orifice plate which extend to and are in communication with the 217a–g, respectively, of a valve mount plate 218. Solenoid valves 220a–g are secured to the valve mount plate in any suitable manner, as by screws 221. The outlet ports 219a–g of the valves are aligned with and in communication with the valve mount ports 217a–g, respectively, and their inlet ports are open to the interior of the manifold housing 224. The manifold housing is also substantially rectangular in form and has a back wall 224a and side walls 224b provided with an external outwardly extending flange 226 adapted to engage the flange 210 of the carriage front wall 205. The orifice and valve mount plates and the manifold housing are secured to the carriage front wall by means of bolts 227 which extend through aligned apertures in the orifice and mount plates and the abutting flanges of the front wall and the manifold housing. A gasket 228 seals between the plates about the grooves of the orifice plate and has slots 229a–g which are aligned with the grooves 216a–g, respectively. A suitable gasket 230 seals between the flange 210 and the valve mount plate.

The valve housings are sealed to the mount plate about the passage 217a–g and 219a–g by a suitable sealing compound, gasket or the like, so that air can flow into each orifice 215a–g only through the housing of its associated valve when the solenoid winding of such valve is energized.

Air under pressure is introduced into the chamber or plenum 235 provided by the manifold housing and the valve plate through a nipple 236 which extends through a suitable aperture in the rear wall 224a of the manifold housing and which is secured thereto by suitable nuts 238, a gasket or seal ring 239 and a washer 240. The valve nipple also extends through a suitable aperture in the rear wall 241 of the carriage housing and may be threaded in the large end of an inlet elbow 242 and be secured to the rear wall 241 of the carriage housing by means of the nuts 243 and washers 245. A flexible conduit 246 is secured in any suitable manner as by fitting 247 to the other end of the elbow fitting. The flexible conduit may extend through a suitable aperture in a wall of the display housing 21 to a suitable source of compressed air under pressure located externally of the display apparatus.

The front wall 205 of the carriage housing has a sensor assembly 250 mounted thereon which includes a pair of electric light bulbs 251 mounted in suitable sockets 253 on the front wall and a photocathode 255 also mounted in a socket 256 also suitably secured to the front wall. The light bulbs and the photocathode tube are aligned vertically and the light bulbs direct their light convergently outwardly so that each time the carriage is in alignment with one of the slots of an outer panel member, the light from the lamp directed through such slot at the reflective strip 125 will be reflected back to the photocathode tube and the photocathode tube will provide a column position signal to a suitable control circuit which then causes selected solenoid valves to be energized as the nozzles move into alignment with passages 113 of the column under such slot. A group sensor assembly 260 (FIGURE 8), which includes a pair of electric light bulbs 261 and a photocathode tube 263, is similarly secured to the front wall 205. The photocathode tube 263 provides a voltage or signal to a control circuit each time it moves into alignment with a slot S of the panel. The group sensor assembly 260 is spaced from the column sensor assembly 250 a distance equal to the distance between the midlines of the adjacent slots of each group G1–Gn of passages of a panel but is spaced therefrom a distance less than the distance between adjacent slots of adjacent groups. For example, if the photosensor assembly 250 is in alignment with the slot S1 of the character Group G1, the group sensor assembly 260 is aligned with its slot S2. However, when the group sensor assembly 260 is positioned in alignment with the first slot S1 of a group G, such as that of Group G2, FIGURE 3, the column sensor assembly 250 will be positioned between the slot S5 of Group 1 and the slot S1 of Group 2. The column sensor assembly 250 will thus not transmit a signal to the control circuit when the carriage is in this position.

The sensor assemblies 250 and 260 as will be explained in greater detail cause opening of preselected valves as the nozzles move into successive alignment with the five columns of each group of passages and also provide a signal of the control circuit as the group sensor assembly moves into alignment with the first column C1 of such group.

A panel position sensor assembly 270 (FIGURES 7–9) includes a pair of light bulbs or lamps 271 and a photocathode 273, mounted in suitable sockets 272 secured to the front wall below the manifold assembly, are disposed in horizontal alignment so that light reflected from the portion of the reflective strip 122 (FIGURE 3) exposed through the bottom longitudinal slot 121 of each panel will provide a signal to an appropriate control circuit which controls operation of the motor 88 and the electromagnetic brake 196 to stop upward movement of each lowermost panel in the front view portion of the path of movement of the display assembly when it moves into proper vertical alignment with the nozzles of the carriage.

In use, assuming that the carriage is at its extreme left hand position, the panel A1 in the front portion A of the path of movement of the display assembly is in position wherein the nozzles are in proper alignment, with the rows of passage. The carriage motor 170 is energized, the motor 88 is deenergized, all of the balls in the panel A1 are now in their outer front positions in the passages 112, all of the solenoid valves are closed and air under pressure is introduced into the manifold housing, as control circuit receives a digital signal from a Teletype line to cause the display apparatus to display data, the clutch 171 is energized by the Teletype signal, and the carriage will move from left to right. As the nozzles of the carriage and the group sensor assembly 260 move into alignment with the first column of the first group G1 of the passages, the signal produced by the photocathode tube of the group sensor assembly 260 and the lack of a signal from the photocathode tube of the column sensor assembly 250 will cause a suitable signal to be transmitted to a control circuit to cause it to permit a new character, either a number or a letter, to be formed by the balls in the first group G1 of passages of the column. As the column sensor assembly moves into alignment with the slot S1 of Group G1, it enables the control circuit to actuate the solenoid valves as the nozzles move into alignment with each column of the Group G1, to cause preselected balls in the passages of such first group of passages to be moved to the rear portions of the passages. As the column sensor assembly 250 moves past the last column C5 of the first group, those balls which have not been moved back will be in their front visible operative positions and will delineate a predetermined alphanumeric character. As the group sensor assembly 260 moves into alignment with the first column of the next group G2, it again enables the control circuit to open the solenoid valves as the nozzles move past the columns of the next group G2 to cause the next character to be delineated or formed by the balls of the next group G2 which have not been moved back to their rear inoperative positions. When the characters of a particular line, as determined by the Teletype message, have all been delineated, a suitable signal is transmitted by the control circuit to deenergize the clutch 171 and simultaneously energize the clutch 180 to cause the carriage to move from right to left at a rapid speed. As the carriage approaches its extreme left position, the electric brake 195 is energized and the clutch 180 is deenergized so that the carriage is held stationary. The motor 88 is energized and the blade 196 is deenergized at the time the carriage begins to move to the left so that the panel assembly is moved to cause the next panel A2 to move into the lowermost portion of the front vertical portion A of the path of movement of the display assembly and, as its slot 121 moves into alignment with the panel sensor assembly 270, the panel sensor assembly 270 provides a signal to the control circuit which causes the control circuit to de-energize the motor 88 and energize the brake 196. The above sequence of operations is repeated as the panel assembly is moved sequentially as determined by the Teletype signal and the information displayed by each panel remains in view for a considerable period of time depending on the speed of movement of the panel assembly and the number of panels thereof which are at all times visible in the front view portion A of the path of movement thereof. The more panels in the front view portion, the longer will be the time the information carried by each panel will be in view for a given speed of transmission of the Teletype signals and the greater the amount of data that can be displayed at one time.

Figures 12, 13, 14, 16, 17, 18:
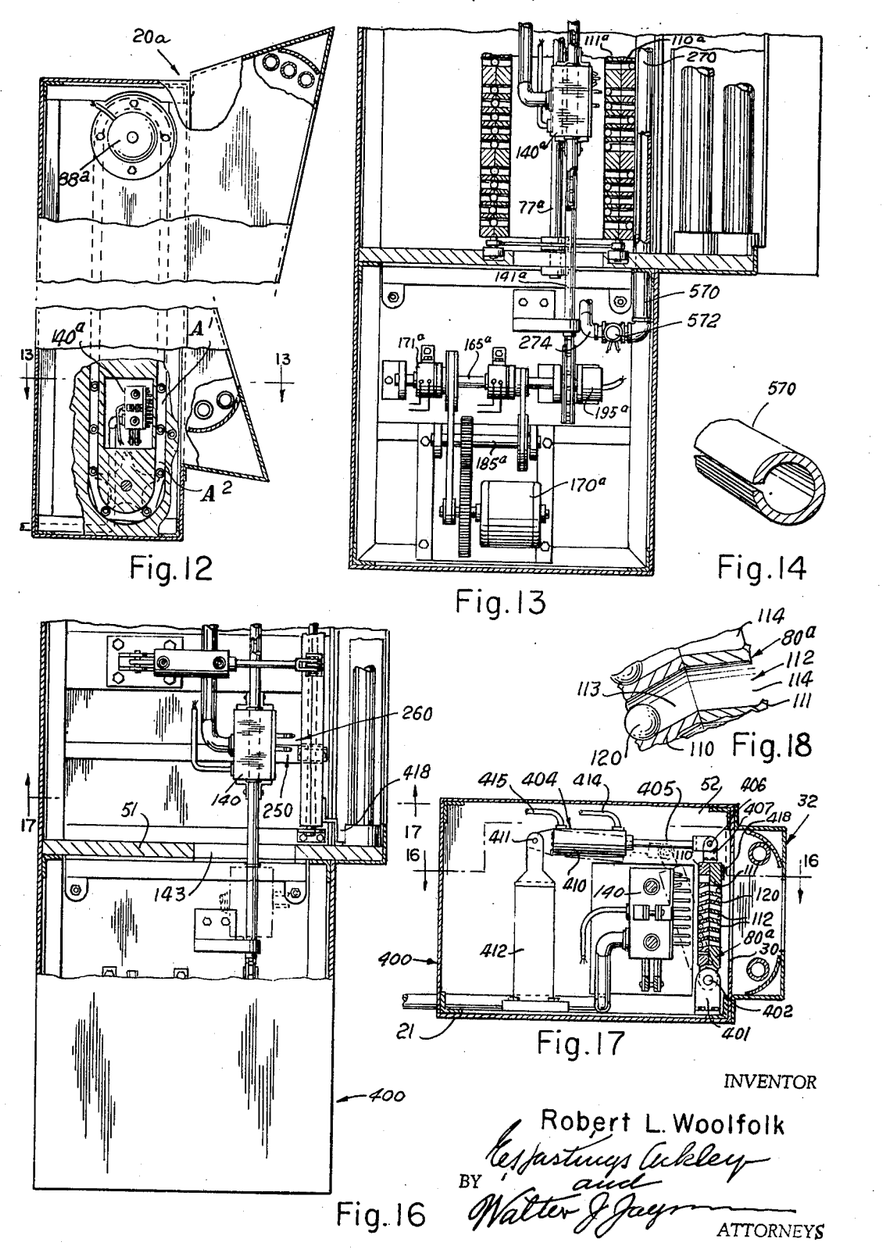
FIGURE 12 is a schematic side view, with some parts broken away, of a modified form of the display apparatus illustrated in FIGURE 1.
FIGURE 13 is a fragmentary sectional view taken on line 13—13 of FIGURE 12.
FIGURE 14 is a fragmentary perspective view of a nozzle pipe of the display apparatus illustrated in FIGURES 12 and 13.
FIGURE 16 is a fragmentary partly sectional view of a modified form of the display apparatus taken on line 16—16 of FIGURE 17.
FIGURE 17 is a partly schematic sectional view taken on line 17—17 of FIGURE 16.
FIGURE 18 is an enlarged fragmentary sectional view of a panel of the apparatus of FIGURE 16.

It will be apparent that if a line of data received from the Teletype line is relatively short and the carriage is returned to its left hand position before it has moved completely across a panel, the balls in the groups of passages to the right of the farthest right hand position reached by the carriage will be in their outer visible positions and may distract from the information displayed by the balls of the groups of passages to the left of such farthest right hand position reached by the carriage. The display apparatus 20a illustrated in FIGURES 12 through 14 is preferred over the apparatus 20 since it causes all of the balls in the lowermost panel A1 to be in their rear non-visible positions before the carriage 140a moves from left to right relative to the panel. The carriage 140a is mounted for movement rearwardly of the front portion A of the path of movement of the display assembly in order that those balls which are to delineate desired characters be moved from their rear inoperative positions to their front outer portions. It will be apparent, of course, that the positions of the planar members 110a and 111a of the panels of the apparatus 20a are reversed from those of the panels 80. The display apparatus 20a is similar to the apparatus 20 and, accordingly, its elements have been provided with the same reference numerals as the corresponding elements of the apparatus 20.

The balls in the panel A2 immediately below the panel A1 and in alignment with the carriage 140a are moved inwardly to their inner or inoperative positions when the motor 88a is energized to move such panel A2 into alignment with the carriage 140a by a stream of air delivered from a nozzle duct 570 by means of an electric solenoid valve 572 and a flexible conduit 274 which extends to a suitable source of air under pressure.

It will be apparent that as the panel A2 moves upwardly to the position occupied by the panel A1 and if air under pressure is being introduced into the duct by means of the solenoid 572, all of the balls of the panel A2 which are initially in their outer visible positions are moved back by the stream of air to their inner inoperative positions. Thereafter, the jets of air from the nozzles of the carriage move selected ones of such balls from their inner inoperative positions to their outer operative positions as the carriage moves horizontally behind and inwardly behind such panel.

Figure 15:
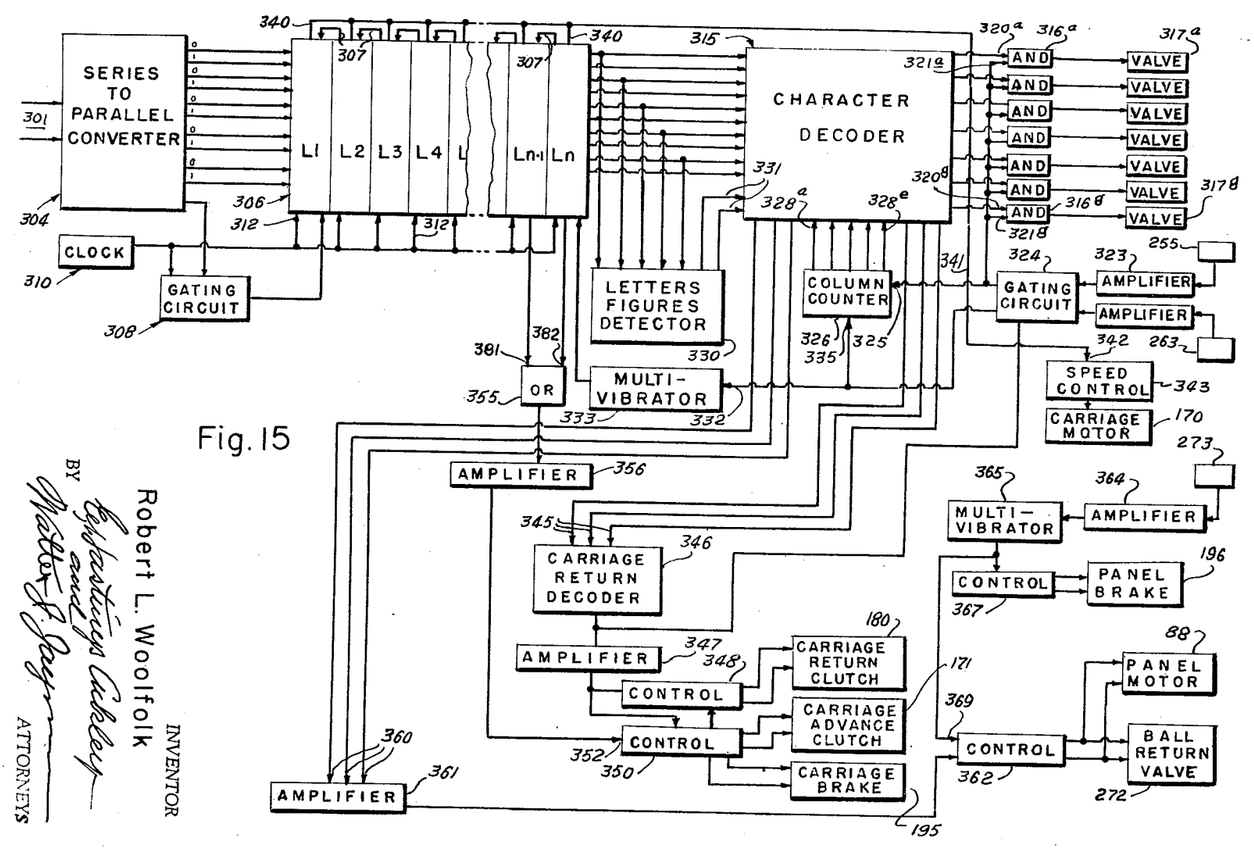
FIGURE 15 is a functional block diagram of a control circuit for the apparatus illustrated in FIGURES 1 through 11, and for the apparatus illustrated in FIGURES 12 through 14.

Referring now to FIGURE 15 of the drawings, the control system for converting the digital Teletype data which is received on the Teletype input lines 301 includes a series-to-parallel digital data converter 304 which converts the serial digital data transmitted on the Teletype input lines to parallel digital data. The parallel output of the converter is transmitted to the first or character entry level L1 of a buffer storage register 306. Each register level provides an inhibit signal through a conductor 307 to the next higher level to prevent transmittal of data from each level to the next lower level if such lower level has data stored therein. Transfer of the data from the converter to the first level occurs only when the usual stop pulse transmitted over the Teletype input lines indicates the end of transmittal of digital data which corresponds to one character. Such stop pulse is transmitted through the converter to a gating circuit 308 which provides a signal which prevents entry into or transfer of data from the first character entry level L1 of the storage register at all times except when a stop pulse is received from the Teletype lines. When the gating circuit receives a stop signal, it causes the data in the first level to be transferred to the next level L2 and resets the first level to zero.

A clock 310 provides the clock or timer pulses to the gating circuit 308 and to the input terminals 312 of the levels of the buffer storage to cause the transfer of data into the first level and from each level to the next lower level to take place in proper timed relation. While the transfer of data from the converter to the first level and from the first level to the second level can take place only when a stop pulse is received from the Teletype lines, the transfer of data from the other levels to their next lower levels can take place at each clock pulse as long as such next lower level is empty. As a result, since the clock has a higher output frequency, for example, 10 kilocycles per second, than the rate of transmittal of digital data corresponding to individual characters over the Teletype lines, the last received individual character data is quickly clocked to the lowermost level Ln if all higher levels happen to be empty or to the next lowermost empty level.

The last level Ln of the buffer storage register transmits the data therein to a character decoder 315 of any suitable type which transmits appropriate signals in accordance with the character data present in the last buffer storage register level Ln through the AND gates 316a–g and amplifiers 317a–g to the solenoid windings of the solenoid valves 220a–g (FIGURE 9), respectively, as the nozzles of the carriage move past a group G of passages whose balls are to delineate that particular character to move selected ones of the balls to the operative positions in the case of the display apparatus 20a and to the inoperative positions in the case of the apparatus 20. The output terminals of the character decoder are connected to the input terminal 320a–g of the AND gates 316a–g while their other input terminals 321a–g have transmitted thereto a signal each time the photocathode tube 255 receives a light reflected from the reflective strip 125 through a slit S as the photo sensor assembly 250 moves into alignment with the slits or slots S of each group of apertures or passages of the panel. The output of the photocathode tube 255 is transmitted through an amplifier 323 and a gating circuit 324 to these input terminals 321a–g of the AND gates. The output of the amplifier 323 is also transmitted by the gating circuit to the input terminal 325 of a column counter 326 during the movement of the carriage from left to right but not during its movement from right to left. The column counter transmits signals successively to the input terminals 328a–e of the character decoder to cause appropriate signals to be transmitted from the character decoder to the AND gate terminals 320a as the nozzles of the carriage move successively into alignment with the columns of passages of each group G during the movement of the carriage from left to right. The control system may also include a letter and figure detector 330, to which the appropriate Teletype signals from the Teletype line are transmitted, which provides an appropriate signal to the input terminals 331 of the character decoder to cause it to decode the input thereto from the last storage level as a letter or a numeral. The gating circuit 324 also provides an output signal to the input terminal 332 of a multivibrator 333 and to the reset input terminal 335 of the column counter when the photocathode tube 255 moves out of alignment with the last slot S5 of Group G of passages of the panel and no signals are received from either the group sensor photocathode tube 263 or the column sensor photocathode tube 255. The last level Ln of the register and the column counter are reset to zero by such signal. The last level then no longer provides an inhibit signal to the next higher level L$n$–1 and, at the next clock pulse applied to the terminals 312, any data in any level is transferred to the next lower level.

Each of the register levels provides an output signal through its output conductor 340 and the conductor 341 to the input terminal 342 of a speed control 343 which controls the speed of rotation of the drive shaft of the carriage motor 170. The speed control increases the speed of rotation of the carriage motor as the number of levels in which data is stored increases and decreases the speed of rotation as the number of filled levels decreases. The carriage return signals transmitted over the Teletype lines are transmitted by the character decoder to the input terminals 345 of a carriage return decoder 346 which then provides an output signal through an amplifier 347 to a suitable control 348 which may include relays, contactors and the like, which then connects the carriage return clutch 180 across an input circuit and also to a control 350 which causes the carriage advance clutch 171 to be disconnected from the input circuit. The control 350 may include a limit switch or the like which causes the carriage brake 195 to be energized when the carriage reaches the extreme left hand limit of its movement by connecting it across an appropriate input circuit. The control 350 also causes deenergization of the carriage advance clutch and the energization of the carriage brake 195 when no data is present in either one of the last two levels of the buffer storage register, signals indicative of the presence of such data in the two bottom levels being transmitted to an input terminal 352 of the control 350 through an OR gate 355 whose input terminals 381 and 382 are connected to the levels L$n$–1 and L$n$ respectively, and whose output signal is transmitted to the input terminal 352 through an amplifier 356.

The panel assembly motor 88 is energized when a line advance signal received over the lines 301 reaches the last level L$n$ of the buffer storage register and is transmitted through the character decoder to the input terminal 360 of an amplifier 361 whose output is in turn transmitted to a control 362. In the case of the display apparatus 20$a$ the control 362 by means of appropriate relays, contactors and the like, causes the solenoid winding of the valve 272 so that as the panel assembly is moved by the motor 88$a$, a flat horizontal stream of air flows on the outer surfaces of the panel A2 as it moves upwardly past the slot 271 of the conduit 270 and the balls thereof which are in their outer operative positions in the passages of such panel are moved back to their inner inoperative positions. When the panel is moved into proper vertical alignment with the nozzles of the carriage, the photocathode tube 273 receives light reflected from the lower reflector strip 122 and its signal is transmitted through an amplifier 364 to a one-shot multivibrator 365. The output of the multivibrator is transmitted to a brake control 367 which causes the panel brake 196 to be energized for a predetermined short period of time and also transmits a signal to an input terminal 369 of the motor control 362 to cause the motor control to simultaneously disconnect both the panel motor and the solenoid winding of the valve 272 from the input circuit.

In use, assuming that all levels of the buffer storage register are empty, the carriage is in its extreme left position and the panel A1 is in alignment with the carriage, the first character entry level L1 of the register is inhibited from either receiving data from the converter or transferring data therefrom to the next level L2. The first character data is then transmitted across the Teletype lines to the series to parallel converter until data representing a full character is received by the parallel converter. The usual Teletype stop pulse signal is then received and causes the gating circuit 308 to permit entry of the data from the converter into the first level L1 when the next clock pulse is received by the gating circuit.

The gating circuit then again provides an inhibit signal to the first level and succeeding clock pulses transmitted to the levels of the register will successively transfer the data from each level to the next lower level until this data reaches the last level L$n$. Subsequent individual character data received from the Teletype lines is successively transmitted to the first level in a similar manner and then transferred to successively lower levels.

As the lowermost level L$n$ is filled it provides an inhibit output signal through its output conductor 307 to the next higher level L$n$–1 to prevent transfer of data from the next to last level to the last level and similarly each level as it is filled with data provides an inhibit signal through its output conductor 307 to the next higher level to prevent transfer thereto of data from the next higher level.

When data is transferred to the lowest and then the second lowest levels, the signals transmitted through the OR gate 355, from either or both of the levels, cause the control 350 to de-energize the carriage brake and to cause the carriage advance clutch to be energized and the carriage then begins to move from left to right behind such panel A1 in the case of the apparatus 20$a$ and in front of the panel in the case of the apparatus 20. The time lag between the energization of the motor carriage advance time lag between the energization of the motor carriage advance clutch when the time information reaches the second lowest level L$n$–1 and the movement of the nozzles of the carriage into alignment with the column C1 of the first group G1 of the passages of the panel is, of course, much longer than the time necessary to transfer the data from the second lowest level to the lowest level. The data in the last register level L$n$ is simultaneously transmitted to the character decoder and to the letters and figures detector 330. If the Teletype signal in the last level is a shift signal which indicates that the succeeding character or characters differ from the previous characters, for example, that a letter follows a previously transmitted numeral or vice versa, this signal is received by the detector 330, and the detector transmits a signal to the input terminals 331 of the character decoder which will then be set to transmit the appropriate signals to cause the balls in the passages of the first group G1 to be moved to define such letter or figure as the case may be. Such shift signal is transmitted over the Teletype lines each time the Teletype data which follows such shift signal is to be different, i.e., numerals instead of letters or vice versa, than the data which preceded such shift signal. As the group sensor photocathode tube 263 moves into alignement with the first slot S1 of the first group G1 of passages, and then the photocathode tubes 263 and 255 move into alignment with the slots S2 and S1, respectively, of the first group the gating circuit 324 transmits a first signal to the column counter which transmits signals successively to the input terminals 328$a$–$e$ of the character decoder to cause the character decoder to transmit appropriate signals to cause the operation of appropriate nozzles as they move successively into alignment with the columns C1–C5 of the first group of the passages of the panel A1.

When the photocathode tube 255 moves out of alignment with the last slot S5 of group G1, the gating circuit 324 transmits a reset signal to the column counter and a reset signal to the last level L$n$ of the buffer storage through the multivibrator 333. The clock pulses then cause movement of data from each filled level to the next lower empty level and as the photocathode tube 255 moves into alignment with the slot S1 of the next character group G2, the above sequence of operation is repeated to cause the balls in the passages of group G2 to be moved to delineate the next character transmitted across the Teletype wires.

If the number of register levels in which data is stored is increased, the speed of the motor 170 is also increased since the signal provided to the speed control 343 increases in value as additional levels are filled. As a result, the movement of the carriage varies in accordance with the rate of transmission of data over the Teletype lines.

When a Teletype carriage return signal transmitted over the Teletype lines indicating the end of a line reaches the last level L$n$, which may be before the carriage actually reaches its extreme right hand position relative to the panel, the character decoder transmits a signal to the input terminals 345 of the carriage return decoder. The output of the carriage return decoder in turn is transmitted to the gating circuit 324 which causes the gating circuit to prevent transmittal of any signals to the solenoid valves, the column counter and the last register level to prevent operation of the valves and resetting of the last level even though the photocathode tubes 255 and 263 will, of course, transmit signals as they are moved past any slots S of a panel. Simultaneously, the output of the amplifier 347 causes the control 348 to energize the carriage return clutch 180 and causes the control 350 to de-energize the carriage advance clutch 171 and the carriage is then moved from right to left.

Simultaneously with the transmittal of the carriage return signal, in the case of the apparatus 20a, the character decoder transmits a line or panel advance signal to the input terminals 360 of the amplifier 361 which causes the motor control 362 to energize the panel motor 88a and the valve 272 so that the balls in the outer operative positions of the panel A2 will be moved by the stream of air from the pipe 570 (FIGURES 13 and 14) to their inner inoperative positions as the panel A2 now moves into position previously occupied by the panel A1. As the slot 121 moves into alignment with the panel sensor assembly 270, the photocathode tube 273 causes a signal to be provided to the brake control to cause the panel brake 196 to be energized for a short period of time and simultaneously to the motor control 362 to cause it to de-energize the panel motor and the solenoid valve 272.

As the carriage reaches its extreme left position, the control 350, which may include a limit switch actuated by the carriage as it approaches its extreme left end position, will transmit a signal to the control 348 to cause the return carriage clutch to be deenergized and will also energize the carriage brake for a short predetermined period of time. Once the carriage is again in its leftmost position and is in alignment with passages of the rows of passages of the panel A2, and if data is present in either of the two lowermost levels of the register, the carriage will again move from left to right, the above sequence of operation will be repeated and the appropriate numerals or figures will be delineated by the balls of the panel A2.

If the last two levels of the register are empty before the carriage reaches its extreme right hand position and no carriage return signal was received over the teletype lines, i.e., the last data in the last level was character data and not carriage return data or signals, a signal is not transmitted through the OR gate and, therefore, the control 350 causes deenergization of the carriage brake 195. As a result, the carriage comes to rest in a position wherein the nozzles are between a pair of the adjacent groups G of the passages of the panel. When additional data is then transmitted across the Teletype lines and reaches the second last level L$n$-1, the control circuit again causes energization of the carriage advance clutch and the deenergization of the carriage brake and the carriage will continue to move to the right.

It will be apparent that while a particular control circuit employing particular logic for controlling the operation of the various components of the display apparatus has been illustrated and described, and other suitable control means for controlling operation of the carriage, the valves and the display or panel assembly may be used which will accept data, such as the typical Teletype serial digital data, and cause the display apparatus to translate and display the data into visible form by causing selected display elements or balls of each panel to be moved to their operative positions.

It will also be apparent that the storage register 306 has a sufficient number of levels to provide enough capacity for the data transmitted over the lines 301, as for example, price quotation of stock on the stock exchanges, ordinarily transmitted at an average rate sufficiently slow that the storage buffer register will never be completely filled even though during some periods of time the rate of transmittal of such data over the Teletype lines may be greater than the rate of translation of such data into display form by the apparatus.

It will also be apparent that the display apparatus 20 and the display apparatus 20a are similar, differing only in that the carriage of the apparatus 20a is moved rearwardly of the panel A1 of the panel assembly so that a means, such as the nozzle duct of pipe 570, must be provided to move the balls of a panel from their outer operative positions to their inner inoperative positions before the carriage moves from left to right.

It will further be seen that in both forms of the display apparatus, the balls are held in either their operative or inoperative positions by gravity and that the control circuit is used to move preselected balls in the case of the display assembly 20a from their inoperative to their operative positions and in the case of the apparatus 20 from their operative to their inoperative positions, to cause the balls in the passages of a particular group G of passages of a panel to form or delineate a desired character, such as a letter, a numeral, or an arithmetic sign.

It will further be seen that in both the display apparatus 20 and 20a, the carriage motor operates at all times so that the motor does not have to start and stop continuously and that the direction of the movement of the carriage is controlled by the clutches 171 and 180.

It will further be seen that the panels have been provided with indexing means such as reflective strips which are visible through the slots S for controlling the operation of the solenoid valve of the nozzles when the nozzles are in proper alignment with the passages of each column of passages, and with similar indexing means for positioning each panel in proper vertical position relative to the carriage.

It will further be seen that the control circuit controls the speed of movement of the carriage in accordance with the amount of data stored in the buffer storage register and thus ensures optimum efficiency and accuracy of operation of the apparatus.

Referring now particularly to FIGURES 16, 17 and 18 of the drawings, the display apparatus 400 embodying the invention utilizes a single panel 80a which is substantially identical to the panels 80 of the apparatus 20 and which is pivoted at its lower end by means of a shaft 402 secured to end brackets 401. The apparatus 400 being similar in many respects to the apparatus 20, its elements have been provided with the same reference numerals as the corresponding elements of the apparatus 20.

The panel 80a is movable between its vertical position illustrated in FIGURE 17 wherein the balls 120 in its passage 112 are positioned in either their inner operative or inner inoperative or outer operative positions by gravity and a rearwardly tilted position, shown in broken lines in FIGURE 17, wherein the bores 114 of the outer panel 111 are inclined downwardly and rearwardly relative to the vertical, as seen in FIGURE 18, so that all of the balls 120 which may have been in their outer operative positions in the bores 114 of the panel member 111 are moved by gravity into the bores 113 of the panel member 110 prior to the movement of the carriage 140 from left to right. The panel is movable between its forward vertical position and its rear inclined position by a pneumatic ram 404 whose piston rod 405 is pivotally connected, as at 406, to a bracket 407 secured to the top edge of the panel 80a. The cylinder 410 of the ram is pivotally secured, as at 411, to a bracket 412. The carriage when in its extreme left hand position is preferably positioned to the left of the support plate 51 (FIGURE 1) so that the carriage will not interfere with the rearward movement of the panel.

When it is desired to erase the characters formed or delineated by the balls of the panel 80a which are in their outer visible or operative positions and cause the balls to delineate other characters, the carriage 140 is moved to its extreme left position as illustrated in FIGURE 1, the piston rod 405 is caused to move inwardly to retracted position by introducing fluid under pressure through the inlet conduit 414 into the forward end of the cylinder and permitting exhaust of fluid from the rear end of the cylinder through the conduit 415, the panel is pivoted to its rear inclined position and all the balls move to their inner inoperative positions where they are not visible through the aperture of its light case 32 and the window 30 of its housing 21. The panel is then moved back to its forward vertical position by introducing fluid under pressure into the conduit 415 and permitting exhaust of fluid through the conduit 414. All of the balls are now in their inner inoperative positions and are held therein by gravity. The carriage 140 when used in the apparatus 400 is not provided with a panel sensor assembly 270 since the panel will be always held in the proper vertical position, when moved to such position, by stops 418 which may be secured in any suitable manner to the support plates 51 and 52 of the apparatus. As the carriage moves from left to right, the flow of jets of air through its nozzles N1–N7, as they move into alignment with each column of each group of passages, will be controlled by a suitable control circuit similar to the control circuit of FIGURE 15 to cause selected balls of each column of each group of passages to be moved to their outer operative positions. Such control circuit will, of course, prevent any flow of air through such nozzles during the movement of the carriage from right to left.

It will be apparent, of course, that since only a single panel 80a is employed, only a single line of data or information can be displayed by the apparatus 400.

Figure 19:
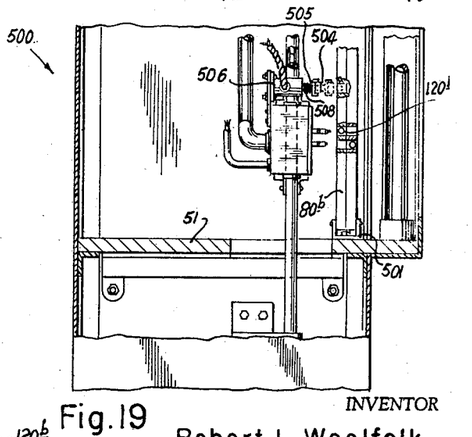
FIGURE 19 is a fragmentary horizontal sectional view similar to FIGURE 16 of another modified form of the display apparatus embodying the invention; and, FIGURE 20 is an enlarged partly sectional view of one of the display elements of the display apparatus illustrated in FIGURE 19.
Figure 20:
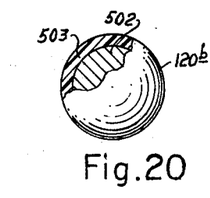

Referring now to FIGURES 19 and 20, of the drawings the display apparatus 500 is similar to the apparatus 400, and, accordingly, its elements have been provided with the same reference numerals as the corresponding elements of the display apparatus 400. The single panel 80b of the apparatus 500 is secured in fixed vertical position by means of suitable brackets 501 secured to the support plates 51 and 52. The movable display element 120b in the passages 112 of the panel have magnetic cores 502 and fluorescent outer layers 503. If desired, magnetic particles dispersed through a ball of fluorescent plastic could be used instead of the magnetic cores. The balls are movable from their outer operative positions to their inner inoperative positions by a permanent magnet 504 which is mounted on the armature 505 of a solenoid 506. The armature may be biased toward its outer position in any suitable manner, as by a spring 508, and is movable inwardly to retracted position when the winding of the solenoid is energized. During the movement of the carriage from left to right, the armature 505 is moved forwardly to the broken line position indicated in FIGURE 19 wherein the magnet 504 is in its operative position and so close to the balls that its magnetic flux is effective to move the balls from their outer operative positions to their inner inoperative positions so that as the carriage moves from the left to the right, any balls in the passages of the panel 80b which are in their operative positions are moved back by the magnetic force to their inner inoperative position. Any characters formed by the balls in the panel in advance of the movement of the carriage 140 are thus wiped out or erased and new characters may thereafter be delineated. During the return movement of the carriage from right to left, the solenoid winding is energized by suitable controls to cause its armature to move to its retracted position where the magnetic force of the magnet 504 acting on the balls is not of sufficient strength to move any balls in operative positions back to their inoperative positions so that the data will be left displayed until the carriage is again moved from left to right.

It will now be seen that the display elements or balls 120 of the panel may be moved in the passages 112 of the panels between their operative and inoperative positions to place them in position to permit the operator means or carriage and its associated elements to move selected balls from one position to another to cause the balls of the panel to form or delineate characters in any suitable manner as by blowing air thereat as in the case of the apparatus 20a, by shifting the position of the panels themselves, or by a magnet as in the case of the apparatus 500.

An electromagnet instead of a permanent magnet 504 could be used in the apparatus 500 in which case the magnet would not have to be mounted on an armature of a solenoid but would be energized only during the movement of the carriage from left to right.

It will further be seen that while in the described and illustrated display apparatus the carriage is movable relative to a stationary panel during the "writing" or formation of data by the balls of the panel the nozzles could be held stationary and the panel be moved relative thereto by appropriate means.

The foregoing description of the invention is explanatory only, and the changes in the details of the construction illustrated may be made by those skilled in the art, within the scope of the appended claims, without departing from the spirit of the invention.

What is claimed and desired to be secured by Letters Patent is:

1. A display device including: an elongated horizontally extending substantially vertical panel, a plurality of elements mounted on said panel for limited movement relative to said panel between operative positions wherein said elements are exposed at an outer side of said panel and inoperative positions wherein said elements are disposed rearwardly of said outer side of said panel, said panel being provided with a plurality of passages extending transversely therethrough and arranged in a predetermined array, said elements being movably positioned in said passages, said elements being positioned in outer portions of said passages when in said operative positions and being positioned in inner portions of said passages when in said inoperative positions, said outer and innner portions of said passages extending convergently upwardly from outer and inner sides of said panel, said panels having means limiting movement of said elements at the opposite ends of said passages whereby said elements are held by gravity in said operative and inopertaive positions when moved thereto.

2. The display device of claim 1; and operator means for moving said elements between said operative and inoperative positions.

3. The display device of claim 2, wherein said operator means includes means for directing jets of gas at said elements when said elements are in one of said operative and inoperative positions to move said elements to the other of said positions.

4. The display device of claim 3, wherein said passages are arranged in vertical spaced columns and horizontal spaced rows.

5. The display device of claim 4, wherein said operator means comprises a plurality of nozzles disposed in a vertical column and aligned with the rows of passages of said display panel, said operator means and said display panel being mounted for horizontal movement relative to one another; and control means operatively associated with said nozzles for causing said nozzles selectively to direct jets of gas at elements in said passages as said nozzles and said passages of each column move into alignment to cause elements of said panel in operative positions to present predetermined visual information.

6. The display device of claim 5, wherein said control means includes a plurality of index means carried by said panels in predetermined relation to said columns of passages to cause said control means to be placed in condition to cause said nozzles to direct jets of gas at the elements only when said nozzles are in alignment with a column of said passages.

7. The display device of claim 6, wherein said control means comprises individual valve means operatively associated with said nozzles.

8. The display device of claim 1, wherein said passages are arranged in spaced vertical columns and spaced horizontal rows; and operator means movable longitudinally relative to said panel for selectively moving selected ones of said elements in said columns of passages from one of said operative and inoperative positions to the other as said operator means moves past said columns of passages.

9. The display device of claim 8, wherein said operator means includes a carriage and a plurality of nozzles disposed in spaced vertical relation and aligned with said rows of passages for directing jets of gas at elements in said passages to move said elements from one of said operative and inoperative poitions to the other.

10. The display device of claim 9, and control means operatively associated with said nozzles for causing said nozzles selectively to direct jets of gas at selected ones of said elements in the passages as said nozzles move successively into alignment with the column of passages to cause elements of said panel in said operative positions to present predetermined visual information.

11. The display device of claim 9, wherein said carriage has second means for moving said elements from one of said operative and inoperative positions to the other during the movement of said carriage in one longitudinal direction relative to said panel.

12. The display device of claim 11, wherein said second means comprises magnet means, said elements being movable by a magnetic field.

13. The display device of claim 9, and second means for moving said elements to said inoperative positions.

14. The display device of claim 13, wherein said second means includes means for moving said panel to cause said elements to move into said inner portions of said passages.

15. A display apparatus including: a display assembly including a plurality of horizontally extending panels pivotally connected to form an endless belt; means for moving said display assembly in a closed path having a front vertical portion, a rear vertical portion, a top portion between the top ends of the front and rear portions and a bottom portion between the bottom ends of the front and rear portions, said panels having a plurality of discrete elements mounted thereon for movement relative thereto between outer operative positions and inner inoperative positions; means operatively associated with said display assembly for moving elements of each of said panels between their operative and inoperative positions to cause each of said panels as it moves in the front view portion of its path of movement to present visual information, said elements being moved by gravity to their inoperative position during the movement of the panels between the top and bottom ends of the front portion of the path of movement.

16. The display apparatus of claim 15, wherein said panels each have a plurality of passages, said passages having outer portions extending upwardly and rearwardly from outer sides of said panel and inner portions extending inwardly and forwardly from inner sides of said panel when said panels are in said front view portion of the path of movement, said elements being movable in said passages between outer operative positions in said outer portions wherein said elements are exposed at the outer sides of said panels and inner positions in said inner portions wherein said elements are not exposed at the outer sides of said panels.

17. The display device of claim 16, wherein said outer and inner portions of said passages of said panels when said panels are in said front view portion of the path extend convergently upwardly from outer and inner sides of said panels, said panels having means limiting movement of said elements at opposite ends of said passages wherein said elements are held by gravity in said operative and inoperative positions when moved thereto when said panels are in said view portion of said path of movement, said elements moving by gravity to said inoperative positions during the movement of said panels between the top and bottom ends of said front view portion of the path of movement.

18. The display device of claim 17, and operator means for selectively moving said elements from said operative positions to inoperative positions.

19. The display device of claim 18, wherein said operator means includes means for directing jets of gas at said elements when said elements are in said operative positions at one end of said forward portion of movement for moving selected elements to said inoperative positions.

20. The display device of claim 17, wherein said passages of said panels are arranged in vertical spaced columns and horizontal spaced rows.

21. The display device of claim 20, wherein said operator means comprises a plurality of nozzles disposed in a vertical column, said operator means being mounted for horizontal longitudinal movement relative to the lowermost of said panels in the front vertical portion of the path of movement; and control means operatively associated with said nozzles for causing said nozzles selectively to direct jets of gas at elements in said passages of the lowermost panel as said nozzles move into alignment with the passages of each column to cause elements of said panel to be moved into inoperative positions and to cause the elements left in operative positions to present predetermined visual information.

22. The display device of claim 21, wherein said control means includes a plurality of index means carried by each of said panels in predetermined relation to said columns of said passages to cause said control means to be placed in condition to operate said nozzles to direct jets of gas at the elements only when said nozzles are in alignment with a column of said passages of the lowermost panel.

23. The display device of claim 22, wherein said control means comprises individual valve means operatively associated with said nozzles.

24. The display device of claim 22, wherein said control means includes second index means carried by said panel in predetermined relation to said columns to cause said means for moving said display assembly to position the lowermost of said panels in predetermined operative relationship to said nozzles whereby said nozzles are aligned with said rows of passages of the lowermost panel.

25. The device of claim 24, wherein said operator means includes a carriage and a plurality of nozzles disposed in spaced vertical relation and aligned with the rows of passages of the lowermost panel in the front portion of the path of movement of said display assembly for directing jets of gas at elements in said passages to move said elements from said operative positions to said inoperative positions.

26. The display device of claim 16, wherein said outer and inner portions of said passages of said panels when said panels are in said front view portion of the path extend convergently upwardly from outer and inner sides of said panels, said panels having means limiting movement of said elements at opposite ends of said passages whereby said elements are held by gravity in said operative and said inoperative positions when said panels are in said front portion of said path of movement, said elements moving by gravity to said inoperative positions during movement of said panels between the top and bottom ends of said front portion of the path of movement; means for moving said elements of each of said panels from said operative positions to said inoperative positions as each of said panels moves from its lowermost position in said front portion of said path of movement; and operator means for selectively moving said elements from said inoperative positions to operative positions to cause said elements moved to operative positions in said passages to delineate characters.

27. The display device of claim 26, wherein said operator means includes means for selectively directing jets of gas at selected ones of said elements when said elements are in said inoperative positions for moving selected elements to said operative positions.

28. The display device of claim 27, wherein said passages of said panels are arranged in vertical spaced columns and horizontal vertically spaced rows.

29. The display device of claim 28, wherein said operator means comprises a plurality of nozzles disposed in a vertical column, said operator means being mounted for horizontal movement relative to a panel in predetermined position in the front vertical portion of the said path of movement; and control means operatively associated with said nozzles for causing said nozzles selectively to direct jets of gas at elements in said passages of said panel in predetermined position as said nozzles move into alignment with the passages of each column of said panel to cause elements of said panel to be moved from inoperative to operative positions to present predetermined visual information.

30. The display device of claim 29, wherein said control means includes a plurality of index means carried by each of said panels in predetermined relation to said columns of said passages, and sensor means carried by said operator means for sensing said index means for causing said control means to be placed in condition to operate said nozzles to direct jets of gas at the elements only when said nozzles are in alignment with a column of said passages of the panel in said predetermined position.

31. The display device of claim 30, wherein said control means comprises individual valve means operatively associated with said nozzles.

32. The display device of claim 31, wherein said control means includes second index means carried by said panel in predetermined relation to said columns and second sensor means for sensing said second index means for causing operation of said means for moving said display assembly to be arrested as a panel reaches said predetermined position in said front portion of the path of movement.

33. The display device of claim 32, wherein said control means comprises a buffer register having a plurality of levels for holding digital data, and means for varying the speed of movement of said operator means in accordance with the degree to which said register is filled with data.

34. The display device of claim 33, and brake means for arresting movement of said operator means, said control means having means for actuating said brake means when said operator means reaches extreme limits of its movement.

References Cited

UNITED STATES PATENTS

| | | |
|---|---|---|
| 3,249,302 | 5/1966 | Bowles. |
| 3,391,480 | 7/1968 | O'Keefe. |
| 3,199,098 | 8/1965 | Schwartz. |

EUGENE R. CAPOZIO, Primary Examiner

W. J. CONTRERAS, Assistant Examiner

U.S. Cl. X.R.

40—37